United States Patent
Novikov et al.

(10) Patent No.: US 10,794,210 B2
(45) Date of Patent: *Oct. 6, 2020

(54) STIFFNESS CONTROLLED ABRADEABLE SEAL SYSTEM AND METHODS OF MAKING SAME

(71) Applicant: UNITED TECHNOLOGIES CORPORATION, Hartford, CT (US)

(72) Inventors: Dmitri Novikov, Avon, CT (US); David Ulrich Furrer, Marlborough, CT (US); Sergei F Burlatsky, West Hartford, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1097 days.

This patent is subject to a terminal disclaimer.

(21) Appl. No.: 14/732,905

(22) Filed: Jun. 8, 2015

(65) Prior Publication Data

US 2016/0160673 A1 Jun. 9, 2016

Related U.S. Application Data

(60) Provisional application No. 62/009,753, filed on Jun. 9, 2014.

(51) Int. Cl.
*F01D 11/12* (2006.01)
*F01D 11/00* (2006.01)

(52) U.S. Cl.
CPC .......... *F01D 11/122* (2013.01); *F01D 11/003* (2013.01); *F05D 2240/307* (2013.01); *F05D 2240/55* (2013.01); *F05D 2300/226* (2013.01); *F05D 2300/228* (2013.01); *F05D 2300/50* (2013.01); *F05D 2300/509* (2013.01); *Y02T 50/672* (2013.01)

(58) Field of Classification Search
None
See application file for complete search history.

(56) References Cited

U.S. PATENT DOCUMENTS

| | | |
|---|---|---|
| 3,540,878 A | 11/1970 | Levine et al. |
| 4,944,800 A | 7/1990 | Kolaska et al. |
| 5,034,282 A | 7/1991 | Hribernik et al. |
| 5,308,376 A | 5/1994 | Oskarsson |
| 5,421,851 A | 6/1995 | Oskarsson et al. |
| 5,447,549 A | 9/1995 | Yoshimura |
| 5,451,365 A | 9/1995 | Barsoum |
| 5,882,561 A | 3/1999 | Barsoum et al. |
| 7,572,313 B2 * | 8/2009 | Palanisamy ............ C22C 29/06 75/241 |
| 8,017,240 B2 * | 9/2011 | Strock ...................... C23C 4/02 427/154 |

(Continued)

*Primary Examiner* — Christopher Verdier
*Assistant Examiner* — Juan G Flores
(74) *Attorney, Agent, or Firm* — Bachman & LaPointe, P.C.

(57) ABSTRACT

A stiffness controlled abradable seal system for a gas turbine engine includes a cantilevered arm that supports one of a rotating seal surface and a static seal surface, a stiffness of the cantilevered arm controlled to achieve a desired operational temperature at a seal interface, and an optimally matched abradeable seal material with required thermophysical and friction properties to enable desired wear mechanisms and maximized sealing and durability.

8 Claims, 8 Drawing Sheets

(56) References Cited

U.S. PATENT DOCUMENTS

| | | | |
|---|---|---|---|
| 8,109,717 B2* | 2/2012 | Glahn | F02C 7/28 |
| | | | 415/174.2 |
| 2005/0287296 A1 | 12/2005 | Wadley et al. | |
| 2006/0194688 A1 | 8/2006 | Sundberg et al. | |
| 2007/0059158 A1* | 3/2007 | Alvanos | F01D 5/081 |
| | | | 415/115 |
| 2010/0055492 A1* | 3/2010 | Barsoum | B22D 19/02 |
| | | | 428/613 |

* cited by examiner

FIG. 9

| 211 | | |
|---|---|---|
| Ti$_2$AlC* | Ti$_2$AlN* | Hf$_2$PbC* |
| Nb$_2$AlC* | (Nb,Ti)$_2$AlC* | Ti$_2$AlN$_{0.5}$C$_{0.5}$* |
| Ti$_2$GeC* | Cr$_2$AlC | Zr$_2$SC |
| Zr$_2$SnC* | Ta$_2$AlC | Ti$_2$SC |
| Hf$_2$SnC* | V$_2$AlC | Nb$_2$SC |
| Ti$_2$SnC* | V$_2$PC | Hf$_2$SC |
| Nb$_2$SnC* | Nb$_2$PC | Ti$_2$GaC |
| Zr$_2$PbC* | Ti$_2$PbC* | V$_2$GaC |
| | | Cr$_2$GaC |
| | | Nb$_2$GaC |
| | | Md$_2$GaC |
| | | Ta$_2$GaC* |
| | | Ti$_2$GaN |
| | | Cr$_2$Gan |
| | | V$_2$GaN |
| | | V$_2$GeC |
| | | V$_2$AsC |
| | | Nb$_2$AsC |
| | | Ti$_2$CdC |
| | | Sc$_2$InC |
| | | Ti$_2$InC |
| | | Zr$_2$InC |
| | | Nb$_2$InC |
| | | Hf$_2$InC |
| | | Ti$_2$InN |
| | | Zr$_2$InN |
| | | Hf$_2$InN |
| | | Hf$_2$SnN |
| | | Ti$_2$TlC |
| | | Zr$_2$TlC |
| | | Hf$_2$TlC |
| | | Zr$_2$TlC |

| 312 | |
|---|---|
| Ti$_3$AlC$_2$* | Ti$_3$GeC$_2$* |
| Ti$_3$SiC$_2$* | |

| 413 |
|---|
| Ti$_4$AlN$_3$* |

STIFFNESS CONTROLLED ABRADEABLE SEAL SYSTEM AND METHODS OF MAKING SAME

CROSS REFERENCE TO RELATED APPLICATION

This application claims the benefit of provisional application Ser. No. 62/009,753, filed Jun. 9, 2014.

BACKGROUND

The present disclosure relates to components for a gas turbine engine and, more particularly, to a stiffness controlled abradable seal system therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases. Seal systems are utilized in many locations within the engine to segregate pressures within the engine sections various protect hardware within the engine from core-gas ingestion.

One type of seal system is an abradable seal that operates by wearing away one or both seal surfaces to provide a tight, line-on-line interface. The pressure that pushes the sliding interfaces together that controls the interface incursion largely dictates the temperature, wear process, and durability of the abradable materials. The pressure that pushes the sliding interfaces together is typically determined by experimentation, or has not been considered as a major design parameter previously.

SUMMARY

A stiffness controlled abradeable seal system for a gas turbine engine, according to one disclosed non-limiting embodiment of the present disclosure includes a static seal surface in contact with a rotating seal surface at a seal interface, said seal interface includes an abradeable material; and a cantilevered arm that supports one of said rotating seal surface and said static seal surface, a stiffness of said cantilevered arm determined to achieve a desired operational temperature.

A further embodiment of the present disclosure includes, wherein said abradeable material includes a solid lubricant material, said solid lubricant material includes a MAX phase content material.

A further embodiment of any of the foregoing embodiments of the present disclosure includes, wherein said solid lubricant material includes an about 5%-60%% volume fraction of MAX phase content material.

A further embodiment of any of the foregoing embodiments of the present disclosure includes, wherein said solid lubricant material includes an about 25% volume fraction of MAX phase content material.

A further embodiment of any of the foregoing embodiments of the present disclosure includes, wherein said seal interface is an abradable seal interface.

A further embodiment of any of the foregoing embodiments of the present disclosure includes, wherein said seal interface is located between a rotor blade tip and a blade outer air seal.

A further embodiment of any of the foregoing embodiments of the present disclosure includes, wherein said seal interface extends from a rotor disk.

A further embodiment of any of the foregoing embodiments of the present disclosure includes, wherein said cantilevered arm extends from a coverplate mounted to a rotor disk.

A further embodiment of any of the foregoing embodiments of the present disclosure includes, wherein said cantilevered arm includes continuous hoop geometry of the cantilevered arm.

A further embodiment of any of the foregoing embodiments of the present disclosure includes, wherein said cantilevered arm includes an arc segment geometry.

A stiffness controlled abradable seal system for a gas turbine engine, according to another disclosed non-limiting embodiment of the present disclosure includes a static seal surface in contact with a rotating seal surface at a seal interface, said seal interface includes a solid lubricant material with an about 5%-60% MAX phase content material in an Al—Si composite; and a cantilevered arm that supports one of said rotating seal surface and said static seal surface.

A further embodiment of any of the foregoing embodiments of the present disclosure includes, wherein said seal interface is an abradeable seal interface.

A further embodiment of any of the foregoing embodiments of the present disclosure includes, wherein said seal interface is located between a rotor blade tip and a blade outer air seal.

A further embodiment of any of the foregoing embodiments of the present disclosure includes, wherein said seal interface extends from a rotor disk.

A further embodiment of any of the foregoing embodiments of the present disclosure includes, wherein said cantilevered arm extends from a coverplate mounted to a rotor disk.

A further embodiment of any of the foregoing embodiments of the present disclosure includes, wherein said cantilevered arm includes continuous hoop geometry of the cantilevered arm.

A further embodiment of any of the foregoing embodiments of the present disclosure includes, wherein said cantilevered arm includes arc segment geometry.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 9 is a periodic table with MAX phase materials for use as a solid lubricant material identified for the stiffness controlled abradable seal system.

DETAILED DESCRIPTION

Figure 1:
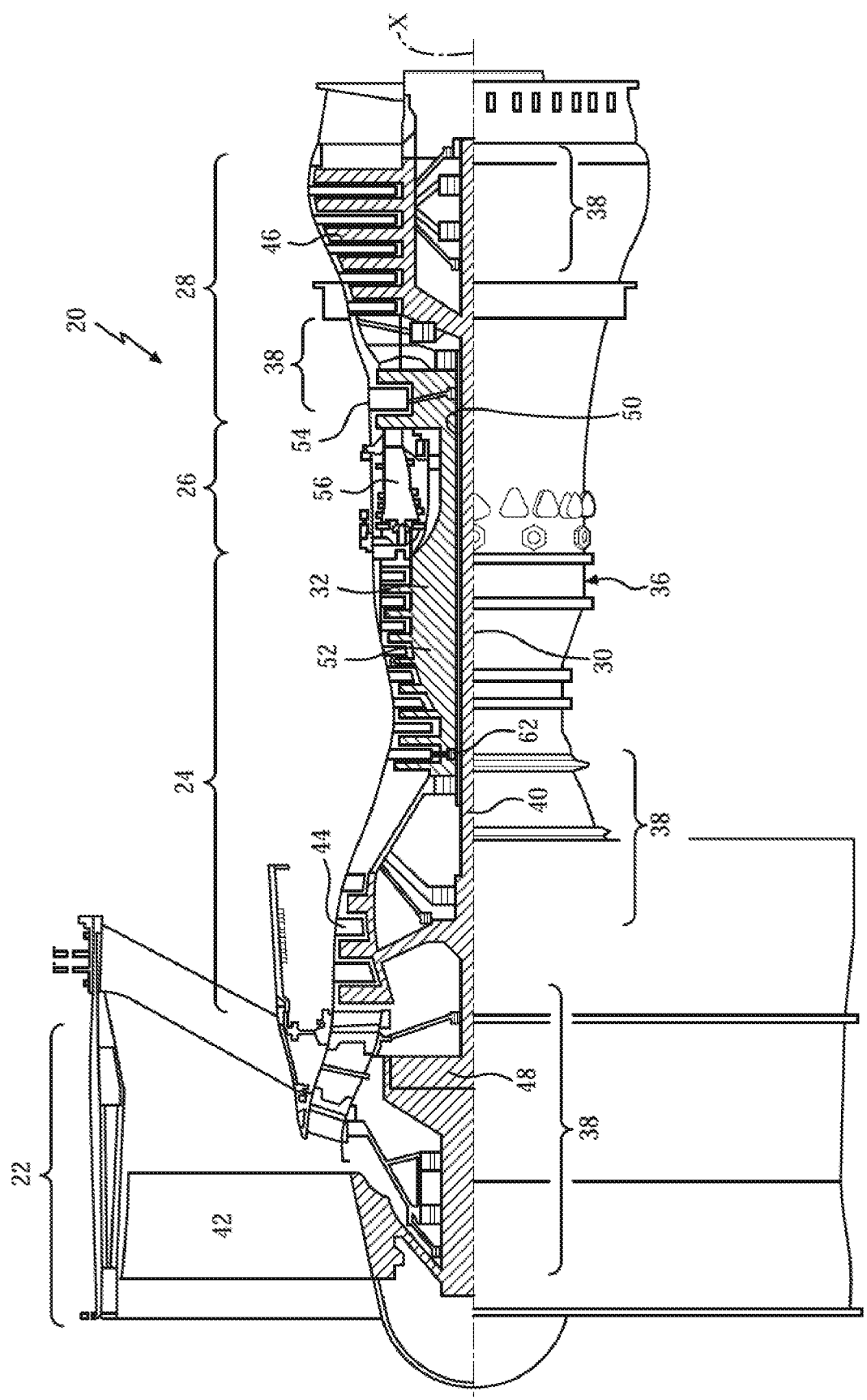
FIG. 1 is a schematic cross-section of an example gas turbine engine architecture.
Figure 2:
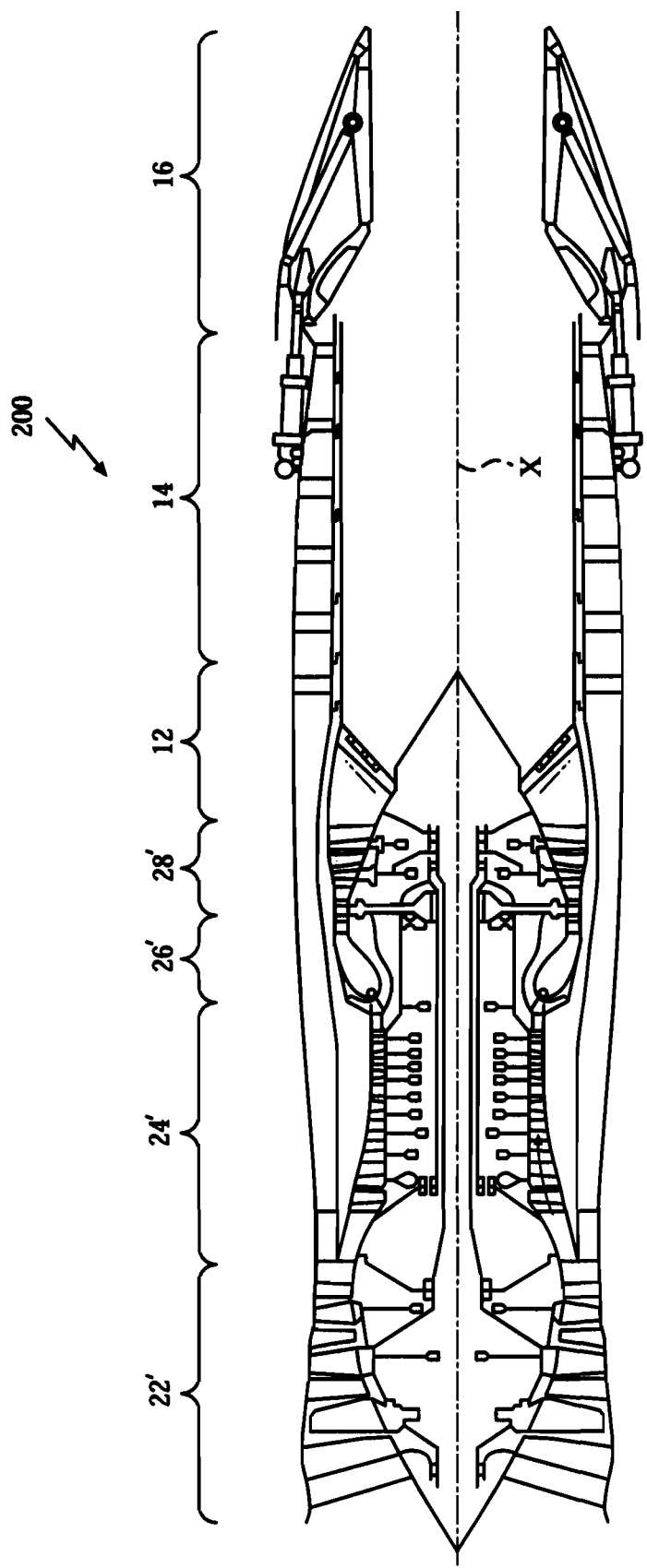
FIG. 2 is a schematic cross-section of another example gas turbine engine architecture.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engine architectures 200 might include an augmentor section 12, an exhaust duct section 14 and a nozzle section 16 (FIG. 2) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engine architectures such as turbojets, turboshafts, and three-spool (plus fan) turbofans.

The engine 20 generally includes a low spool 30 and a high spool 32 mounted for rotation about an engine central longitudinal axis X relative to an engine case structure 36 via a multiple of bearing assemblies 38. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the HPC 52 and the HPT 54. The inner shaft 40 and the outer shaft 50 are concentric and rotate about the engine central longitudinal axis A.

Core airflow is compressed by the LPC 44, then the HPC 52, mixed with the fuel and burned in the combustor 56, then expanded over the HPT 54 and the LPT 46. The HPT 54 and the LPT 46 rotationally drive the respective low spool 30 and high spool 32 in response to the expansion.

Figure 3:
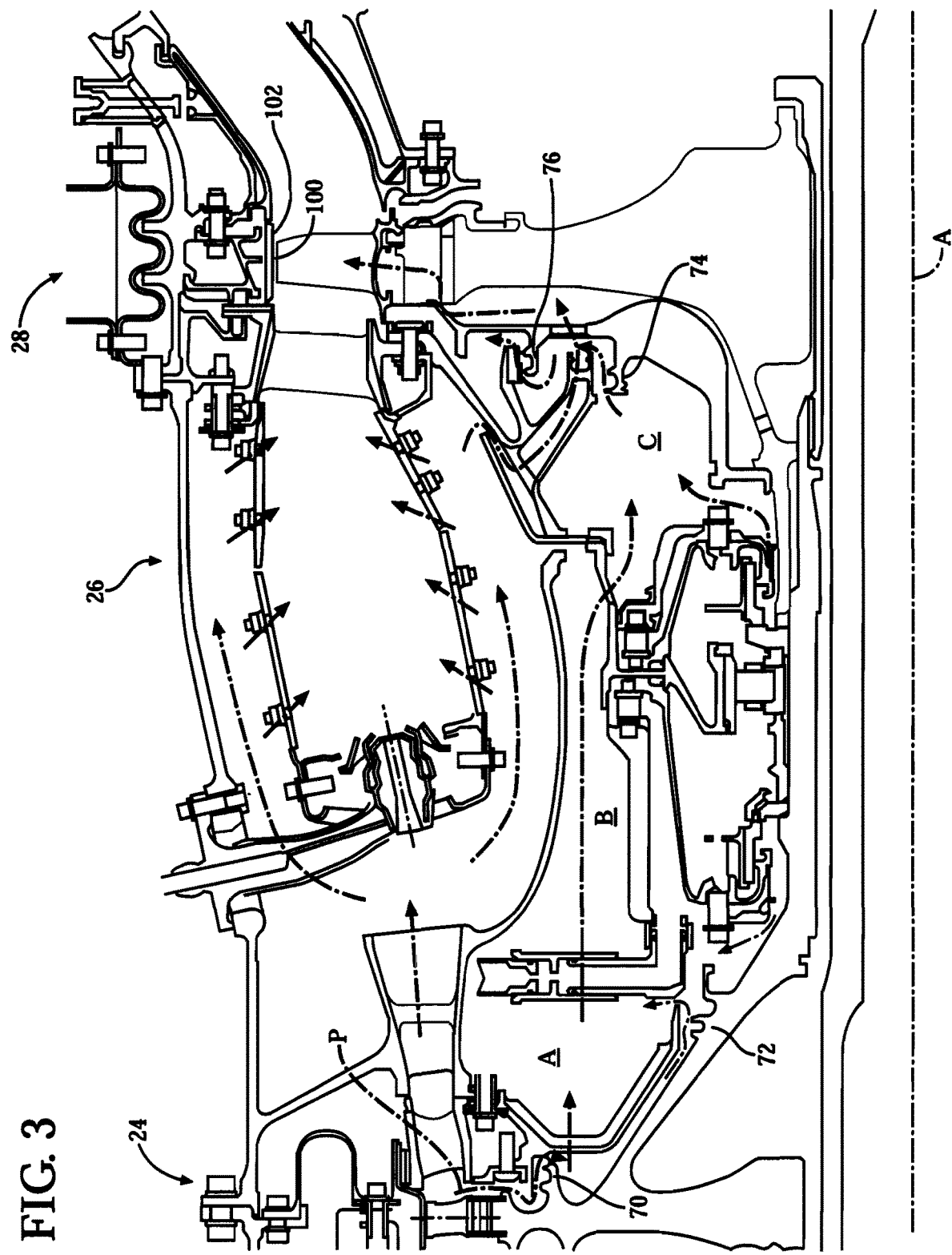
FIG. 3 is an enlarged schematic cross-section across a multiple of engine sections to show the seal systems therebetween.

With reference to FIG. 3, an enlarged schematic view of a portion of the engine 20 is shown by way of example; however, other engine sections will also benefit herefrom. Purge air P at a relatively high pressure from an upstream section of the engine 20, for example, the compressor section 24 is communicated into the relatively lower pressure turbine section 28 to prevent ingestion of hot gas core airflow and its contaminants into internal cavities A, B, C across the illustrated compressor section 24, combustor section 26 and turbine section 28. To segregate the hot gas core airflow from the Purge air P, a multiple of seals 70, 72, 74, 76 are arranged across and within the engine sections. It should be appreciated that numerous seals and locations therefor will benefit herefrom and the seals 70, 72, 74, 76 are merely examples thereof.

Figure 4:
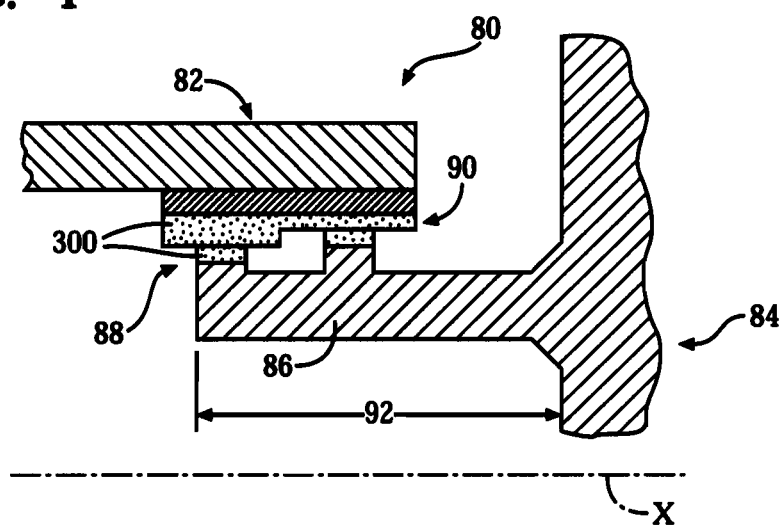
FIG. 4 is a schematic view of stiffness controlled abradable seal system according to one disclosed non-limiting embodiment.

With reference to FIG. 4, one or more of the seals 70, 72, 74, 76 may be a stiffness controlled abradable seal system 80. In one disclosed non-limiting embodiment, the stiffness controlled abradable seal system 80 includes a static seal surface 82, a rotating seal surface 84, and a cantilevered arm 86. The rotating seal surface 84 and the static seal surface 82 defines an abradable seal interface 88. It should be appreciated that various alternative seal architectures such as a drive arm seal system 72 (FIG. 3) that connects rotor stages within the engine, and rotor blade tip 100 to Blade Outer Air Seal (BOAS) 102 (FIG. 3) interfaces will also benefit herefrom. Other alternative seal architectures such as cantilever stators and rotating abradeable seal surfaces will also benefit herefrom.

The stiffness controlled abradable seal system 80 is defined by a relationship between seal geometry stiffness, designed interference (strain) and the load on the sealing surfaces (stress). TABLE 1 below includes examples of possible ranges of seal parameters and the resultant interface stress and temperatures in which the light shaded boxes are preferred and the dark shaded boxes are not preferred. It can be seen that there is a critical stiffness to avoid excessive heating. The specific stiffness and interface stress will depend on the seal and abradable material combination selections and the engine operating conditions, but can be determine by this approach.

TABLE 1

| Parameters | | | | | | |
|---|---|---|---|---|---|---|
| Incursion distance | 1 mm | 1 mm | 1 mm | 1 mm | 1 mm | 1 mm |
|  | 0.04" | 0.04" | 0.04" | 0.04" | 0.04" | 0.04" |
| Blade velocity | 500 m/s | 500 m/s | 500 m/s | 500 m/s | 500 m/s | 500 m/s |
|  | 1640 fps | 1640 fps | 1640 fps | 1640 fps | 1640 fps | 1640 fps |
| Friction coefficient | 0.3 | 0.3 | 0.3 | 0.3 | 0.3 | 0.3 |
| Wear coefficient | 0.001 | 0.001 | 0.001 | 0.001 | 0.001 | 0.001 |
| Coating hardness | 5 Mpa | 5 Mpa | 5 Mpa | 50 MPa | 50 MPa | 50 MPa |
|  | 725 psi | 725 psi | 725 psi | 7251 psi | 7251 psi | 7251 psi |
| Arm stiffness [Pa * m] | 1.00E+06 | 1.00E+05 | 1.00E+04 | 1.00E+06 | 1.00E+05 | 1.00E+04 |
| Pressure | 1.3 MPa | 0.3 MPa | 0.04 MPa | 1.8 MPa | 0.33 MPa | 0.05 MPa |
|  | 188 psi | 44 psi | 5.8 psi | 261 psi | 48 psi | 7 psi |
| Temperature | 1750 C. | 600 C. | 350 C. | 2800 C. | 615 C. | 350 C. |
|  | 3182 F. | 1112 F. | 662 F. | 5072 F. | 1139 F. | 662 F. |

TABLE 1-continued

| Parameters | | | | | | |
|---|---|---|---|---|---|---|
| Incursion distance | 1 mm | 1 mm | 1 mm | 1 mm | 1 mm | 1 mm |
| | 0.04" | 0.04" | 0.04" | 0.04" | 0.04" | 0.04" |
| Blade velocity | 500 m/s | 500 m/s | 500 m/s | 500 m/s | 500 m/s | 500 m/s |
| | 1640 fps | 1640 fps | 1640 fps | 1640 fps | 1640 fps | 1640 fps |
| Friction coefficient | 0.1 | 0.1 | 0.1 | 0.1 | 0.1 | 0.1 |
| Wear coefficient | 0.001 | 0.001 | 0.001 | 0.001 | 0.001 | 0.001 |
| Coating hardness | 5 Mpa | 5 Mpa | 5 Mpa | 50 MPa | 50 MPa | 50 MPa |
| | 725 psi | 725 psi | 725 psi | 7251 psi | 7251 psi | 7251 psi |
| Arm stiffness [Pa * m] | 1.00E+06 | 1.00E+05 | 1.00E+04 | 1.00E+06 | 1.00E+05 | 1.00E+04 |
| Pressure | 1.5 MPa | 0.32 MPa | 0.4 MPa | 2.2 MPa | 0.33 MPa | 0.04 MPa |
| | 218 psi | 46 psi | 58 psi | 319 psi | 48 psi | 5.8 psi |
| Temperature | 850 C. | 400 C. | 310 C. | 1300 C. | 400 C. | 320 C. |
| | 1562 F. | 752 F. | 590 F. | 2372 F. | 752 F. | 608 F. |
| Parameters | | | | | | |
| Incursion distance | 1 mm | 1 mm | 1 mm | 1 mm | 1 mm | 1 mm |
| | 0.04" | 0.04" | 0.04" | 0.04" | 0.04" | 0.04" |
| Blade velocity | 500 m/s | 500 m/s | 500 m/s | 500 m/s | 500 m/s | 500 m/s |
| | 1640 fps | 1640 fps | 1640 fps | 1640 fps | 1640 fps | 1640 fps |
| Friction coefficient | 0.3 | 0.3 | 0.3 | 0.3 | 0.3 | 0.3 |
| Wear coefficient | 0.01 | 0.01 | 0.01 | 0.01 | 0.01 | 0.01 |
| Coating hardness | 5 Mpa | 5 Mpa | 5 Mpa | 50 MPa | 50 MPa | 50 MPa |
| | 725 psi | 725 psi | 725 psi | 7251 psi | 7251 psi | 7251 psi |
| Arm stiffness [Pa * m] | 1.00E+06 | 1.00E+05 | 1.00E+04 | 1.00E+06 | 1.00E+05 | 1.00E+04 |
| Pressure | 0.2 MPa | 0.16 MP | 0.03 MPa | 0.3 MPa | 0.2 MPa | 0.04 MPa |
| | 29 psi | 23 psi | 4 psi | 44 psi | 29 psi | 5.8 psi |
| Temperature | 670 C. | 475 C. | 330 C. | 830 C. | 500 C. | 320 C. |
| | 1238 F. | 887 F. | 626 F. | 1526 F. | 932 F. | 608 F. |

Figure 5:
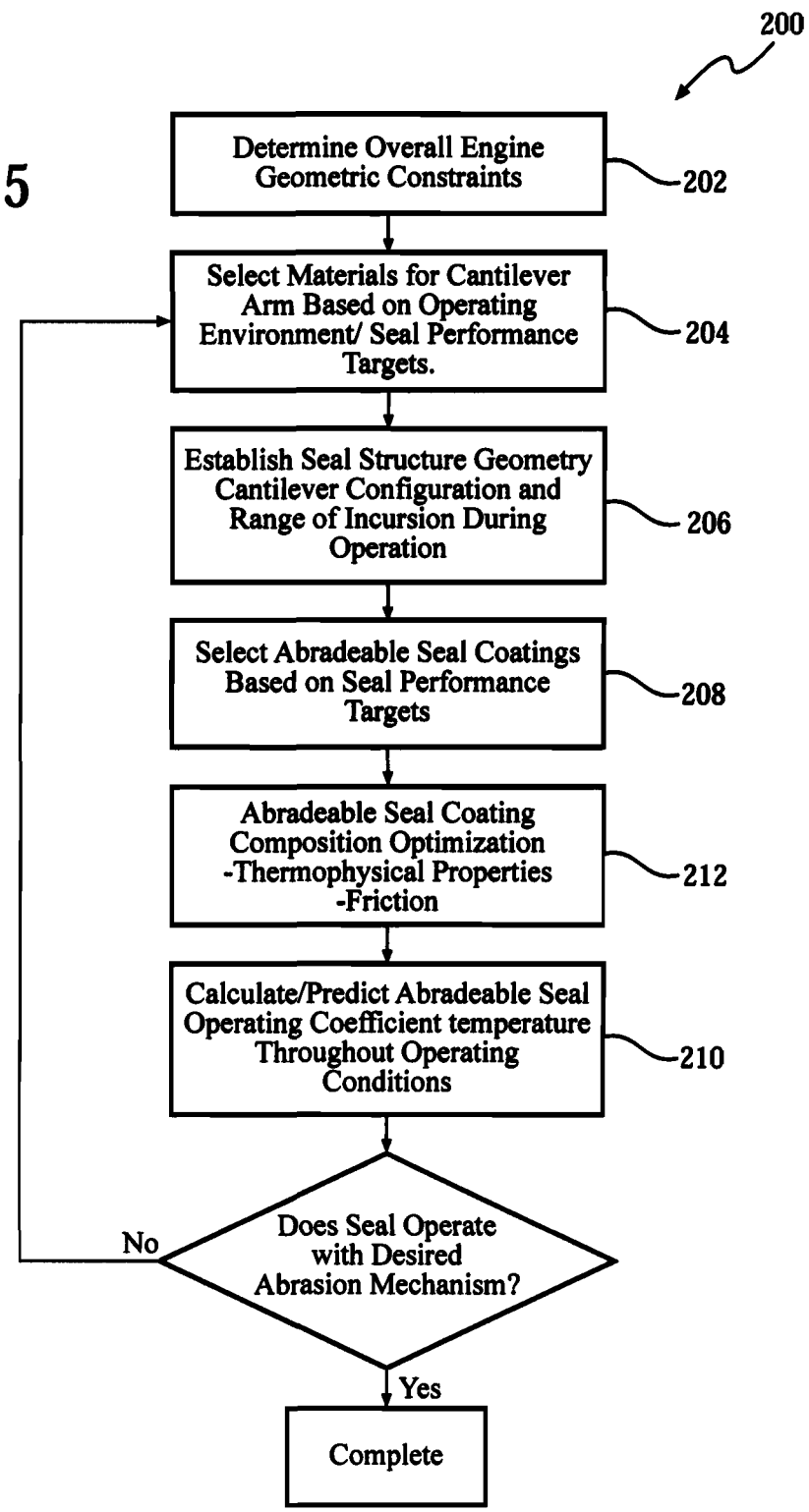
FIG. 5 is a flow chart illustrating a method for defining a desired stiffness for a cantilevered arm within a stiffness controlled abradable seal system.

With reference to FIG. 5, a method 200 is outlined for defining a stiffness for the cantilevered arm 86 within the stiffness controlled abradable seal system 80. The stiffness produces a desired interface normal stress (pressure pushing the sliding surface together) during the entire engine mission so that an operational temperature is maintained within a desired temperature range to mitigate the mechanisms of metal transfer and/or melting of the rub and abradeable seal system. That is, there is a range of material and geometric stiffness for a given incursion that will provide for optimal abradeable seal performance. Minimizing temperature at the abrasion interface will produce a stable abrasion process and not allow for metal transfer (galling) and heating to the point of alloy component melting.

The stiffness of the cantilevered arm 86, in this disclosed non-limiting embodiment, is the controlling variable. In this disclosed non-limiting embodiment, the fixed parameters of overall engine geometric constrains (step 202), the materials for the cantilevered arm 86 based on the operating environment (step 204), the structure geometry of the cantilevered arm 86 (step 206), and the abradeable coating system 90 (step 208) are selected. At least the following parameters for the stiffness controlled abradable seal system 80 are readily determined therefrom: Incursion Distance, the interference between seal arm and abradable seal as a function of temperature and operating condition; Seal Velocity, relative velocity between the static seal surface 82 and the rotating seal surface 84, e.g. a rotor blade or disk velocity; Friction Coefficient for static seal surface 82 and the rotating seal surface 84; Wear Coefficient for the abradable coating system 90; and Coating Hardness of abradable coating system 90.

Figure 6:
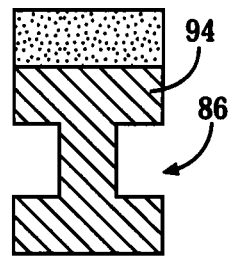
FIG. 6 is a cross-section of the cantilevered arm of the stiffness controlled abradable seal system according to one disclosed non-limiting embodiment.

The abradable coating system 90 (step 208) may be further controlled through optimization of a solid lubricant material 300 (Step 212). The stiffness of the cantilevered arm 86 may be controlled via material selection (step 204), and/or physical properties (step 206) such as length 92 (FIG. 3), a cross-sectional area 94 (FIG. 6), etc. The stiffness of the cantilevered arm 86 is a combination of inherent material stiffness (elastic modulus; $\lambda_m$) based on material selection, and geometric stiffness (moment of inertia or bending; $\lambda_g$) based on physical properties. The stiffness of the cantilevered arm 86 (step 206) is thereby selected to produce a pre-determined and optimized stress level at the seal interface 88 to achieve the desired operational temperature at the seal interface 88 (step 210) such that the seal interface 88 operates with a desired abrasion mechanism.

Figure 7:
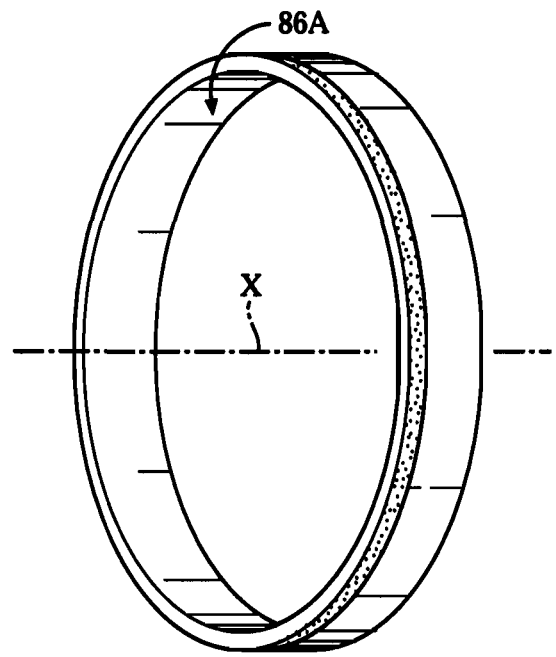
FIG. 7 is a perspective view of a geometry according to one disclosed non-limiting embodiment for the cantilevered arm.
Figure 8:
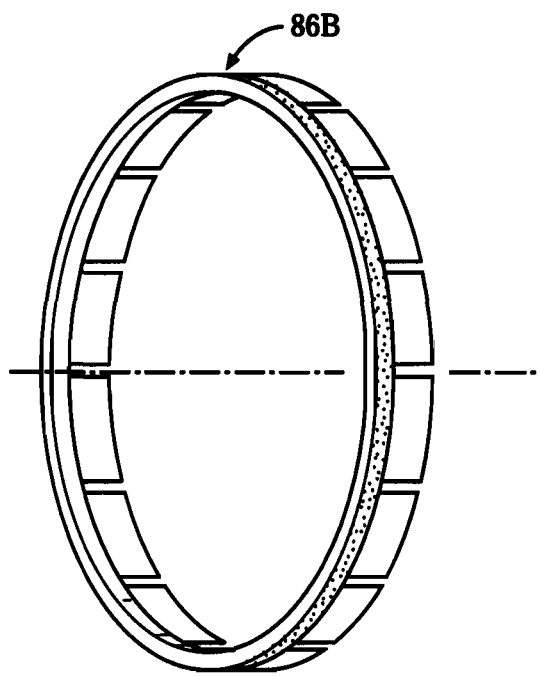
FIG. 8 is a perspective view of a geometry according to another disclosed non-limiting embodiment for the cantilevered arm.

The geometric stiffness of the cantilever arm 86 may be controlled via, for example, a continuous hoop geometry 90A (FIG. 7), or an arc segment geometry 90B (FIG. 8) to thereby control a desired abradable seal interface pressure. The arc segment geometry 90B may be further arranged to provide minimal arc segment clearance to mitigate pressure losses and provide a local pumping effect to cool the local abradable seal interface. The stiffness of the cantilevered arm 86 is thereby determined so that as pressure is increased from increased incursion due to differential temperature, differential rates of thermal expansion or other drivers between the mating static seal surface 82 and the rotating seal surface 84, the cantilevered arm 86 bends consistent with the increase in incursion.

As the seal system geometry changes during operation due to temperature or other drivers, the mating static seal surface 84 and the rotating seal surface 84 come into contact with a resulting interference stress ($\sigma_s$). The interference stress ($\sigma_s$) is the load per interface area required to produce the contacted geometry versus the geometries of each mating component as if the other components were not present. The geometric interference ($\varepsilon_i$) is effectively the strain that results from the interference fit of the thermally expanded abradeable seal interface 88.

The equation that drives control of the effective stiffness of the cantilevered arm 86 is given by:

$$[(\text{Material Stiffness}) + (\text{Geometric Stiffness})] * (\text{Geometric Interference}) = \text{Optimum Interface Stress}$$
(i.e. Load per interface area)

Or $$(\lambda_m+\lambda_g)*(\varepsilon_i)=\sigma_s$$

The optimum geometry of the stiffness controlled abradable seal system 80 is one that provides an optimum interface stress to enable optimization of the heating and wear mechanisms of the abradable seal interface 88.

As the friction coefficient of the abradable seal interface 88 can vary with temperature, though is demonstrated as a constant in the disclosed analysis, reduction of the initial and evolving friction coefficient thereof facilitates optimization of the stiffness controlled abradable seal system 80.

In another disclosed non-limiting embodiment, the abradable coating system 90 includes a solid lubricant material 300 (FIG. 4). The solid lubricant material 300 are composites of at least one metal combined with at least one member of a class of ternary compounds defined by the general composition M.sub.n+1AX.sub.n, hereinafter MAX phase materials, wherein M is an early transition metal selected from groups IIIB, IVB, VB, and VIB, A is an element selected from groups IIIA, IVA, VA, VIA, and VIIA, X is either carbon or nitrogen, and n is an integer between 1 and 3. Exemplary transition metals for the MAX compounds include scandium, titanium, vanadium, chromium, zirconium, niobium, molybdenum, hafnium, and tantalum. Exemplary group A elements include aluminum, gallium, indium, tellurium, silicon, geranium, tin, lead, phosphorus, arsenic, and sulfur. An exemplary metal that is combined with the MAX compounds is a soft metal such as silver, gold, copper, platinum, and combinations or alloys of the same. Preferred soft metals include gold and silver at a concentration ranging between about 5 and about 30% by weight.

The MAX phase materials are layered hexagonal solids with two formula units per unit cell in which near close-packed layers of early transition metals are interleaved with layers of pure group A-element atoms with the C and/or N-atoms filling the octahedral sites of early transition metal layers (FIG. 9). These phases, in addition to unique characteristics such as superb machinability, damage tolerance, damping capability, low thermal expansion, excellent thermal and electrical conductivity, and high specific modulus, have low friction coefficients and self-lubricating properties.

The physical mechanism of friction coefficient reduction for MAX phase materials generally includes MAX phase particle deposition within the abradable seal interface 88. The MAX phase particles may be incorporated into either, or both, the static seal surface 82 and the rotating seal surface 84 to thereby operate as a solid lubricant source.

Figure 10:
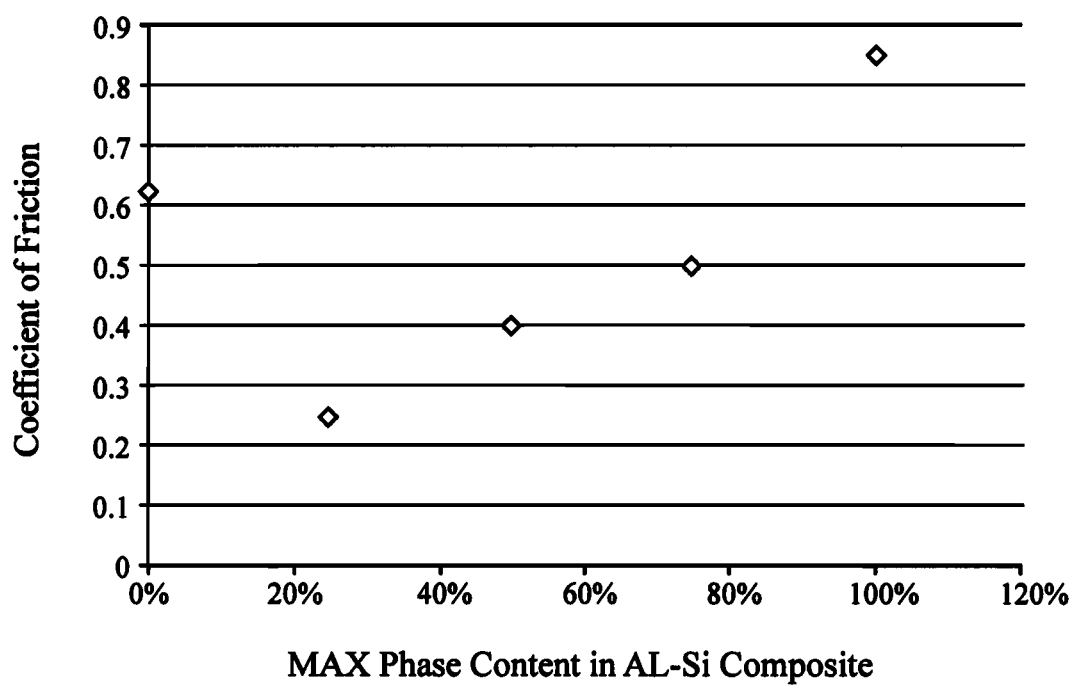
FIG. 10 is a graphical representation of a content percentage of the MAX phase materials for the stiffness controlled abradable seal system.

With reference to FIG. 10, an addition of 25% and 50% of MAX phase materials will change the friction coefficient from about 0.6 (0% MAX phase content in Al—Si composite), to about 0.2 (25% MAX phase content in Al—Si composite), and about 0.4 (50% MAX phase content in Al—Si composite). These results indicate that the dependence of the friction coefficient on the amount of MAX phase material is non-linear and there is an optimum MAX phase amount that minimizes the friction coefficient of the resulting composite material. In one disclosed non-limiting embodiment, an about 25% volume fraction of MAX phase material is preferred.

A combination of material and geometric stiffness provides a range of interfacial stress for a given range of strain. Optimum seal system design thereby result when the range of interface stresses over the range of interfacial strains are within a desired operational temperature range to enable maximum seal life and operation performance.

The use of the terms "a," "an," "the," and similar references are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed:

1. A stiffness controlled abradable seal system for a gas turbine engine, comprising:
   a solid lubricant material comprising at least one metal combined with at least one member of a class of ternary compounds, said at least one metal combined with said at least one member of a class of ternary compounds is defined by the general composition M.sub.n+1AX.sub.n, wherein M is an early transition metal selected from groups IIIB, IVB, VB, and VIB, A is an element selected from groups IIIA, IVA, VA, VIA, and VIIA, X is either carbon or nitrogen, and n is an integer between 1 and 3 to minimize a friction coefficient, wherein said solid lubricant material includes an about 25% volume fraction of a MAX phase content material.

2. The system as recited in claim 1, wherein said abradable seal system is an abradable seal interface.

3. The system as recited in claim 1, wherein said abradable seal system is located between a rotor blade tip and a blade outer air seal.

4. The system as recited in claim 1, wherein said abradable seal system extends from a rotor disk.

5. The system as recited in claim 1, wherein said abradable seal system is located upon a cantilevered arm.

6. The system as recited in claim 5, wherein said cantilevered arm includes continuous hoop geometry of the cantilevered arm.

7. The system as recited in claim 5, wherein said cantilevered arm includes an arc segment geometry.

8. A stiffness controlled abradable seal system located between a rotor blade tip and a blade outer air seal for a gas turbine engine, comprising:

a solid lubricant material comprising at least one metal combined with at least one member of a class of ternary compounds, said at least one metal combined with said at least one member of a class of ternary compounds is defined by the general composition $M_{n+1}AX_n$, wherein M is an early transition metal selected from groups IIIB, IVB, VB, and VIB, A is an element selected from groups IIIA, IVA, VA, VIA, and VIIA, X is either carbon or nitrogen, and n is an integer between 1 and 3, wherein said solid lubricant material includes an about 25% volume fraction of a MAX phase content material.

* * * * *